United States Patent [19]

Morris

[11] Patent Number: 5,057,214

[45] Date of Patent: Oct. 15, 1991

[54] FILTRATION AND BACKWASH CONTROL SYSTEM FOR WATER FILTERS ASSOCIATED WITH SPIGOT FAUCETS

[76] Inventor: Carl F. Morris, 11725 S. Ridgeland - Lot #17, Worth, Ill. 60482

[21] Appl. No.: 533,782

[22] Filed: Jun. 6, 1990

[51] Int. Cl.⁵ ............................................. F16K 11/06
[52] U.S. Cl. .................................... 210/136; 137/597; 137/625.29; 137/625.34; 210/278; 210/425
[58] Field of Search ................ 137/597, 599.1, 625.29, 137/625.34, 625.35; 210/136, 278, 282, 424, 425, 426, 449, 411

[56] References Cited

U.S. PATENT DOCUMENTS

| | | | |
|---|---|---|---|
| 3,195,726 | 7/1965 | Saurenman et al. | 137/597 |
| 3,526,251 | 9/1970 | Rosaen | 137/625.29 |
| 3,977,433 | 8/1976 | Hankison et al. | 137/625.29 |
| 4,469,131 | 9/1984 | Traylor | 137/625.29 |
| 4,515,692 | 5/1985 | Chandler et al. | 210/278 |

FOREIGN PATENT DOCUMENTS 64-58880 3/1989 Japan .......................... 137/625.34

Primary Examiner—Robert A. Dawson
Assistant Examiner—Joseph Drodge
Attorney, Agent, or Firm—Lee, Mann, Smith, McWilliams & Sweeney

[57] ABSTRACT

A filtration and backwash control system for use with replaceable cartridge filters including a spool valve for controlling the flow of filtered water and backwash discharge from an existing faucet spigot having cold water and hot water faucets. The valve is movable between a filter position, wherein cold water is directed through the valve, through a filter, back through the valve and out the cold water faucet, and a backwash position, wherein hot water is directed through the valve, through the filter in reverse flow from filter outlet to filter inlet, back through the valve and out the hot water faucet.

17 Claims, 2 Drawing Sheets

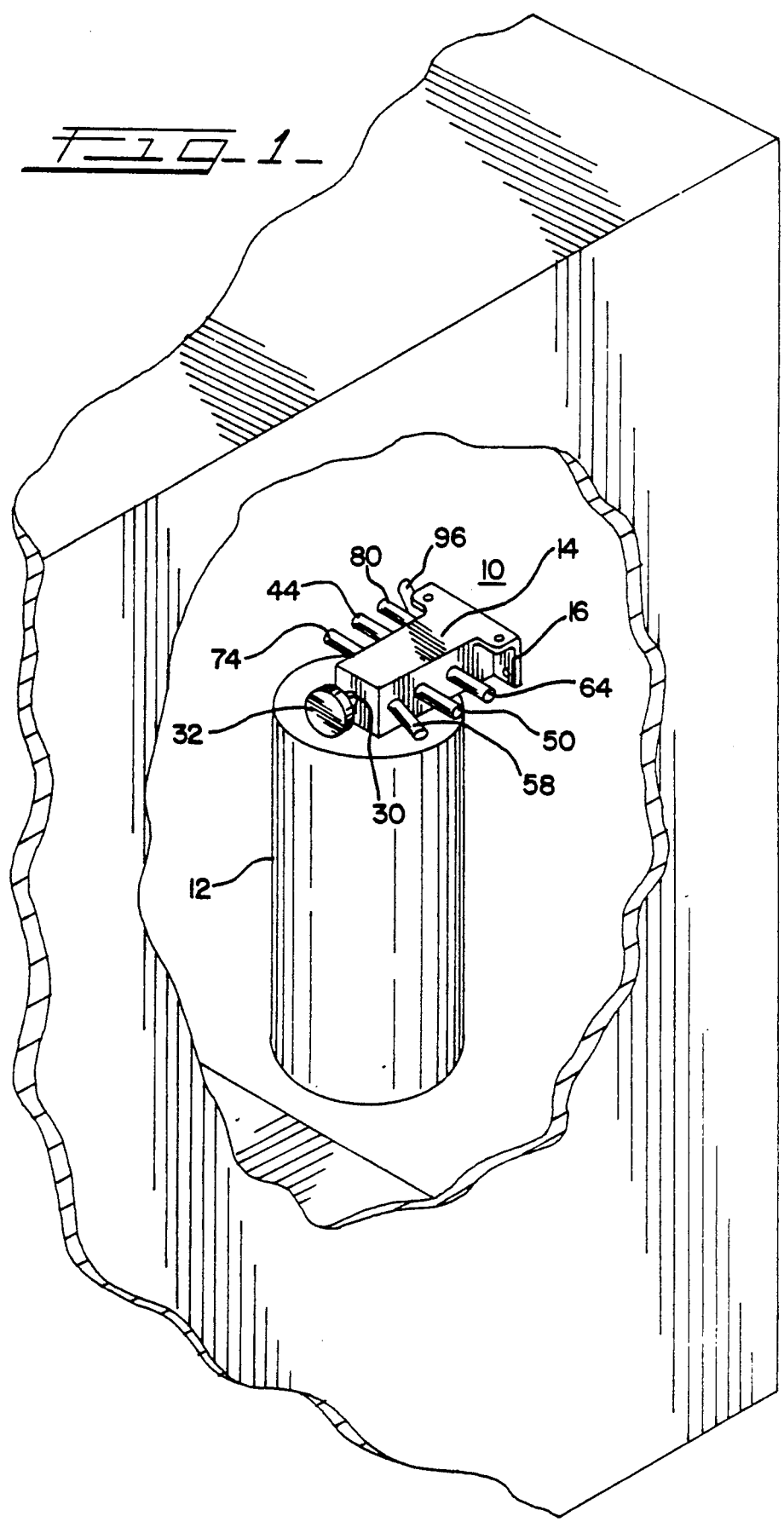

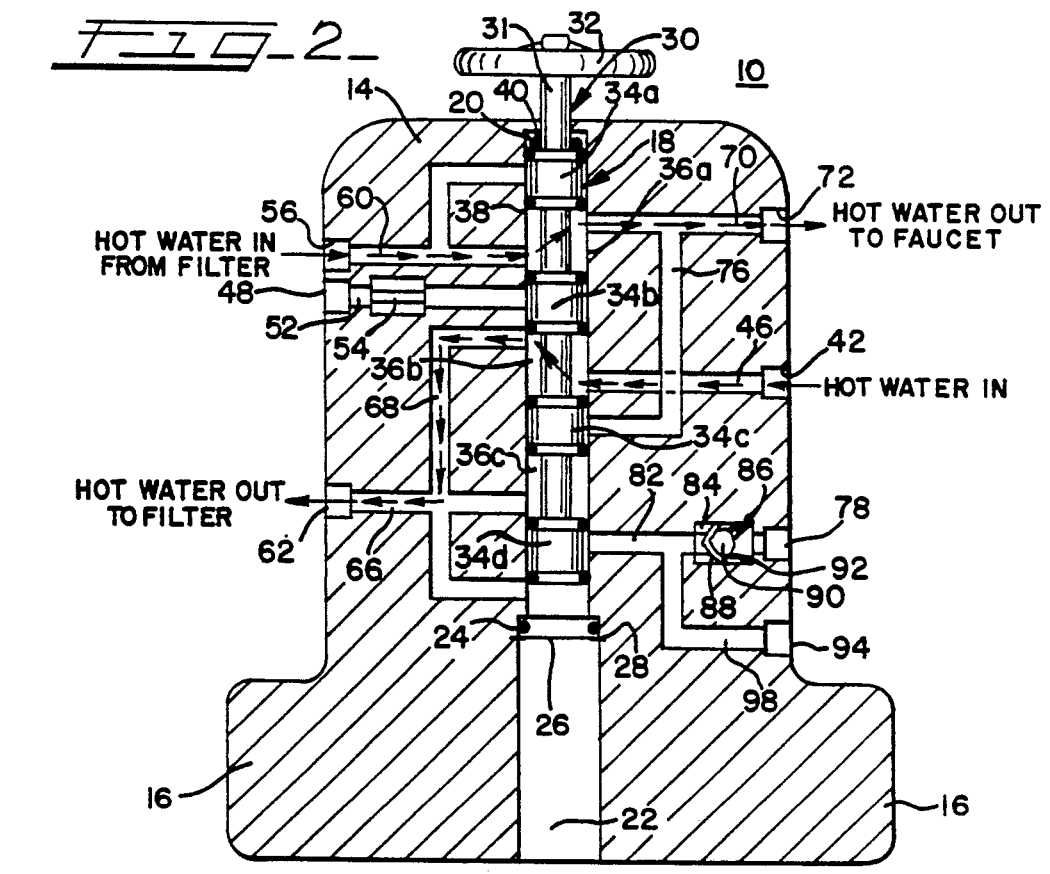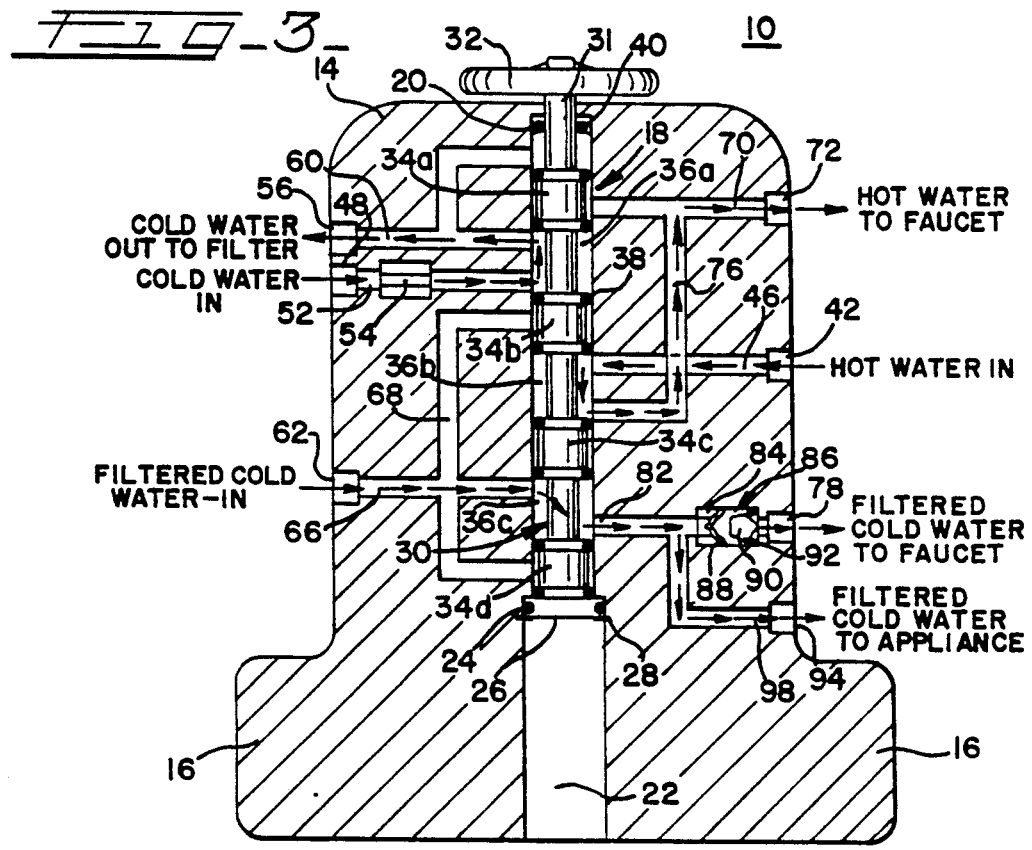

FILTRATION AND BACKWASH CONTROL SYSTEM FOR WATER FILTERS ASSOCIATED WITH SPIGOT FAUCETS

BACKGROUND OF THE INVENTION

The present invention is directed to a replaceable cartridge filter and backwash control system for filtration of drinking water. The system includes a valve for controlling the flow of filtered water and backwash discharge. Filtration of drinking water may be accomplished by employing any of several types of commercially available filters, including granular activated carbon bed filters, solid block carbon media filters and carbon media cartridge filters. Granular activated carbon bed filters and solid block carbon media filters may be rejuvenated by periodic backwashing or reverse flushing with hot water. Backwashing, when performed with water of 140° F. or more, has benefits similar to pasteurization, in that, the hot water will destroy most of the bacteria present in the filter while flushing accumulated sediment and debris therefrom. Filter units incorporating these types of filters must be returned to the seller for carbon replacement after a limited number of backwashing cycles, since backwashing shortens the life of the filter. A carbon media cartridge filter may be purchased and easily replaced by the user himself. Prior to the present invention, hot water backwashing was not used with carbon media cartridge filters. Therefore, the life of the carbon media cartridge filter could not be extended. The cost of a replacement cartridge coupled with the inconvenience to the user and the complexity of changing the filter, often prompts him to ignore the recommended replacement schedule and hence, his cartridge carbon media filter becomes essentially ineffective. Numerous arrangements of various types of water filters are shown in the prior art U.S. Pat. Nos. 3,316,937, 3,707,233, 3,977,433, 4,105,555, 4,115,276, 4,301,009, 4,515,692, 4,553,566. None of these patents discloses the features of the present invention.

SUMMARY OF THE INVENTION

The present invention provides a filtration system which includes a replaceable cartridge filter and a control valve for directing fluid flow during both filter and backwash operations. The valve includes a housing having a plurality of inlet and outlet ports and a plurality of interconnecting fluid channels. A spool valve member having a plurality of spools fixed thereon at set intervals, is slidably disposed within a central passage defined through the housing. An actuation member is provided for moving the spool valve member between a first filter position and a second backwash position. When the spool valve member is in the first, filter position, unfiltered cold water is directed through the control valve and through the filter and the filtered cold water is directed back through the valve and to the cold water faucet. When the spool valve member is in the second, backwash position hot water is directed through the valve through the filter outlet in reverse flow and out the filter inlet, back through the valve and to the hot water faucet, thereby providing backwash of the filter and backwash discharge from the faucet spigot. An internal check valve prevents backwash discharge from being communicated to auxiliary appliances, such as ice makers, in the event that the cold water faucet is inadvertently opened.

BRIEF DESCRIPTION OF THE DRAWINGS

FIG. 1 shows a perspective view of the control valve and cartridge system of the present invention.

FIG. 2 shows a cross-sectional view of the control valve in the backwash position.

FIG. 3 shows a cross-sectional view of the control valve in the filter position.

DETAILED DESCRIPTION OF THE INVENTION

A filtration and backwash control system for potable water, which includes a replaceable cartridge filter and a flow control valve is shown in FIGS. 1-3. The flow control valve, generally designated by the numeral 10, is adapted for in-line connection between a cartridge carbon media filter 12 and sources of unfiltered hot and cold water (not shown) and hot and cold water faucets (not shown). While the control valve 10 of the present invention is specifically designed for use with a replaceable carbon media cartridge filter 12, it is understood that the valve 10 may be used with any type of water filter, as a granular activated carbon bed filter or a solid block carbon media filter. The control valve 10 includes a housing 14 defining at its lower end a pair of opposing, outwardly-extending, brackets 16 for attaching the valve 10 to a wall or other surface. The valve 10 may be assembled to the cartridge carbon media filter 12, as shown in FIG. 1, in which case, the valve 10 actually supports the filter 12, or the valve 10 may be mounted remote from the filter, especially when a larger, bed-type filter is being used.

A substantially cylindrical, longitudinally-extending central passage 18 is defined through the housing 14. The central passage 18 includes an upper portion 20 and a lower portion 22, the lower portion 22 having a larger circumference than the upper portion 20. An o-ring seal 24 is positioned at the top of the lower portion 22. A cover plate 26 is disposed adjacent the seal 24 and is held in place by a retainer clip 28.

A spool valve 30, is slidably disposed within the central passage 18. The spool valve 30 includes a support rod 31, which extends outwardly from the top of the valve body 14 and an actuation member in the form of a knob 32 which is secured to the upper end of the support rod 31 to move the spool valve 30 between a filter position, shown in FIG. 3, and a backwash position shown in FIG. 2, which will be more fully described below. The knob 32 may be set up for manual actuation or automatic actuation, as by means of a solenoid. Four spools 34a, 34b, 34c and 34d are fixed on the support rod 31 at fixed intervals. The spools 34 have circumferences slightly smaller than the circumference of the upper portion 20 of the central passage 18 so that they are slidable therein. Flow chambers 36a, 36b and 36c are defined between each adjacent pair of spools 34a and 34b, 34b and 34c, and 34c and 34d, respectively. An o-ring seal 38 is provided at each end of each spool 34 to prevent fluid flow between the chambers 36. A guide seal 40 is positioned at the upper end of the upper portion 20 of the central passage 18.

The valve body 14 is provided with a plurality of ports, each of which is in communication with the central passage 18. A first port 42 is connectable to a source of hot water (not shown) via a conduit, tube or similar means, as shown at 44 in FIG. 1. A channel 46 provides fluid communication between the first port 42 and the central passage 18. A second port 48 is connectable to a source of cold water (not shown) via a conduit 50, shown in FIG. 1. A channel 52 provides fluid communication between the second port 48 and the central passage 18. The channel 52 is provided with a constrictor orifice 54 which acts to snub line pressure and to regulate water flow to optimize the absorption characteristics of the filter 12.

A third port 56 is connectable to the inlet of the cartridge carbon media water filter via a conduit 58, shown in FIG. 1. A channel 60 provides fluid communication between the third port 56 and the central passage 18. A fourth port 62 is connectable to the filter outlet via a conduit 64, shown in FIG. 1. Fluid communication is provided between the fourth port 62 and the central passage 18 via a channel 66. An auxiliary channel 68, branches off from the channel 66 to provide an additional flow path between channel 66 and the central passage 18. A fifth port 72 is provided, which is connectable to a hot water faucet (not shown) via a conduit 74. A channel 70 connects port 72 and central passage 18. Auxiliary channel 76, branches off from the channel 70 to provide an additional flow path between channel 70 and the central passage 18. A sixth port 78, connectable to a cold water faucet (not shown) via a conduit 80, is provided. A channel 82 interconnects the central passage 18 and the sixth port 78. The channel 82 includes a check valve chamber 84 adjacent the sixth port 78 in which a check valve assembly, generally designated by the numeral 86, is disposed. The check valve assembly 86 includes a valve seat 88, a ball or disc 90 and a return spring 92. The check valve assembly 86 prevents backwash discharge from being communicated to auxiliary appliances, as ice makers, in the event that the cold water faucet is in advertently opened.

A seventh port 94 may also be provided. The seventh port 94 is connectable via a conduit 96 to an ice maker or other appliance wherein the use of filtered water may be desired. A channel 98 provides fluid communication between channel 82 and port 94.

Operation of the control valve 10 in the filter mode and the backwash mode will now be described. FIG. 3 illustrates the valve 10 in the filtering mode. Once the control valve 10 is connected between the filter 12 and the hot and cold water faucets and the sources of hot and cold water, the knob 32 is moved downwardly so that the support rod 31 and spools 34 are located in the position shown in FIG. 3. In this position, spool 34a blocks fluid communication between channel 70 and flow chamber 36a of the central passage 18. Spool 34b cuts-off fluid communication between auxiliary channel 68 and flow chamber 36b of the central passage 18. When the cold water is turned on, cold water is directed via conduit 50 through the second port 48, flows through the channel 52 into flow chamber 36a, through the channel 60 and out the third port 56 into the inlet of the filter 12. The cold water moves through the filter 12 and is filtered. The filtered water exits through the outlet of the filter 12 and is directed through the fourth port 62, through the channel 66, through flow chamber 36c, through the channels 82 and 98 and out the sixth and seventh ports 78 and 94, respectively. The cold, filtered water that exits the sixth port 78 flows via conduit 80 to the cold water faucet and exits the water faucet spigot (not shown) for use. The cold, filtered water that exits the seventh port 94 flows via conduit 96 to a household appliance, as an ice maker.

Hot water flows via conduit 44 into the first port 42 and through the channel 46 into flow chamber 36b. It is then directed through auxiliary channel 76 into the channel 70 and out the fifth port 7 where it flows via conduit 74 to the hot water faucet and exits the water faucet spigot for use. It is to be noted that the filtration system described above provides for filtration of cold water, but not hot water. As will become apparent below in the description of the hot water backwashing system, hot water releases sediment and debris from carbon media, and therefore attempting to filter hot water would have the opposite result desired.

When it is desired to backwash the filter to clean it and prolong its useful life, the knob 32 is moved upwardly, to the position shown in FIG. 2. In this position, spool 34b prevents fluid communication between the channel 52 and flow chamber 36a of the central passage 18. Spool 34c prevents fluid communication between auxiliary channel 76 and flow chamber 36b of the central passage 18. Spool 34d blocks fluid communication between the channels 82 and 98 and flow chamber 36c of the central passage 18. Flow chamber 36a is in fluid communication with both the channels 60 and 70 and flow chamber 36b is in fluid communication with the channels 46 and 66.

Hot water flows via conduit 44 into the first port 42, through the channel 46 and into flow chamber 36b. It is then directed through auxiliary channel 68, through channel 66 and out the fourth port 62 and, via conduit 64, through the filter outlet, thereby loosening and removing accumulated debris and sediment. The hot water continues in a reverse flow through the filter 12 removing sediment, exits the filter inlet and enters the third port 56 via conduit 58. The hot water flows through channel 60 into flow chamber 36a and is directed through channel 70, out the fifth port 72 and via conduit 74 through the hot water faucet. The hot water and debris is expelled through the water faucet spigot. The carbon media cartridge filter 12, after having been backwashed for a sufficient period of time, is clean and rejuvenated. Additionally, because sufficiently hot water (140° F. or more) has been used for the backwashing procedure, the filter 12 has, in effect, been pasteurized, since the hot water kills germs and bacteria present therein. The life of the replaceable cartridge filter 12 has been extended and the filter 12 better serves the purpose for which it was installed in the first place—to provide cleaner, healthier water.

Thus it has been shown that the present invention provides an improved control valve for in-line connection between a water filter and sources of cold and hot water and cold and hot water faucets to provide cold filtered water and hot water backwash discharge.

Various feature of the invention have been particularly shown and described in connection with the illustrated embodiment of the invention, however, it must be understood that these particular arrangements merely illustrate and that the invention is to be given its fullest interpretation within the terms of the appended claims.

What is claimed is:

1. A water filter and backwash control system for filtration of potable water including a water filter having an inlet, an outlet, and a filtration media through which water to be treated passes between said inlet and outlet; a control valve in fluid flow communication with said filter inlet and outlet and including a housing having a cold, unfiltered water inlet port adapted to be connected in fluid flow communication with a source of cold, unfiltered water; a hot water inlet port adapted to be connected in fluid flow communication with a source of hot water; a cold, filtered water outlet port adapted to be connected in fluid flow communication with a cold water faucet of a faucet spigot; a hot water outlet port adapted to be connected in fluid flow communication with a hot water faucet of said faucet spigot; a cold, unfiltered water outlet port adapted to be connected in fluid flow communication with said filter inlet; a cold, filtered water inlet port adapted to be connected in fluid flow communication with said filter outlet; a spool valve member slidably disposed in said housing movable between a first, filter, position and a second, backwash, position; a central fluid passage defined in said housing; a plurality of fluid channels defined in said housing, each channel in fluid communication with said central fluid passage and one of said ports; means for moving said spool valve member between said first and second positions; said control valve operative such that when said spool valve member is in said filter position a pair of filtration fluid circuits are established including, a first filtration circuit conducting cold water from said cold, unfiltered water inlet port, through said central passage, through said filtration media, through said central passage again and to said cold water faucet and a second filtration circuit conducting hot water from said hot water inlet port, through said central passage and to said hot water faucet, said control valve further operative such that when said spool valve is in said backwash position, said valve blocks flow between said cold unfiltered water inlet port and said central fluid passage and a backwash fluid circuit is established, conducting hot water from said hot water inlet port, through said central passage, through said filter outlet, through said filtration media in a reverse flow direction, through said filter inlet, through said central passage again and to said hot water faucet, whereby said filtration fluid circuits provide cold, filtered water to said faucet spigot and said backwash fluid circuit provides hot water backwash discharge from said faucet spigot.

2. The system of claim 1 including a second cold, filtered water outlet port adapted to be connected in fluid flow communication with a household appliance.

3. The system of claim 1 including a constrictor orifice associated with said cold, unfiltered water inlet port to regulate the flow of water therethrough.

4. The system of claim 1 including a check valve chamber and check valve assembly associated with said cold, filtered water faucet outlet port.

5. The system of claim 1 including a replaceable cartridge filter in which said filtration media is disposed.

6. The system of claim 5 wherein said replaceable cartridge filter is a carbon media cartridge filter.

7. The system of claim 1 including a pair of mounting brackets associated with said control valve housing.

8. The system of claim 1 wherein said means for moving said spool valve between said first and second positions comprises a knob.

9. A control valve for use with a water filter to provide filtered water and backwash discharge from a water faucet spigot, said control valve including a housing; a central passage extending through said housing; a spool valve member extending through said central passage and movable between a first position and a second position; means for actuating said spool valve member between said first and second positions; a first port defined through said housing connectable to a source of hot water; a first channel defined through said housing which provides fluid communication between said central passage and said first port; a second port defined through said housing connectable to a source of cold water; a second channel defined through said housing which provides fluid communication between said central passage and said second port; a third port defined through said housing connectable to an inlet of said water filter; a third channel defined through said housing which provides fluid communication between said central passage and said third port; a fourth port defined through said housing connectable to a outlet of said filter; a fourth channel defined through said housing which provides fluid communication between said central passage and said fourth port; a first auxiliary channel defined through said housing, said first auxiliary channel branching off from said fourth channel and providing a fluid flow path between said fourth channel and said central passage; a fifth port defined through said housing connectable to a hot water faucet; a fifth channel defined through said housing which provides fluid communication between said central passage and said fifth port; a second auxiliary channel defined through said housing, said second auxiliary channel branching off from said fifth channel and providing a fluid flow path between said fifth channel and said central passage; a sixth port defined through said housing connectable to a cold water faucet; a sixth channel defined through said housing which provides fluid communication between said central passage and said sixth port; such that when said spool valve is moved to said first position, cold water from said source of cold water enters said valve through said second port, is directed through said valve into said inlet of said filter, through said filter, out said filter outlet into said fourth port, back through said valve, out said sixth port to said cold water faucet and out said faucet spigot, and hot water from said source of hot water enters said valve through said first port, is directed through said valve, through said fifth port, to said hot water faucet and out said faucet spigot, but when said spool valve member is moved to said second position, said cold water enters said second port and said second channel is blocked by one of said spools from moving further through said valve and said hot water enters said first port, is directed through said valve into said filter outlet, flows through said filter and out said filter inlet into said third port, is directed through said valve, out said fifth port and to said hot water faucet and out said faucet spigot, whereby cold, filtered water is obtained when said spool valve member is in said first position and hot water backwash discharge is achieved when said spool valve member is in said second position.

10. The control valve of claim 9 wherein said sixth channel is provided with a check valve chamber in which a check valve assembly is disposed.

11. The control valve of claim 9 wherein said second channel is provided with a constrictor orifice to regulate the flow of water therethrough.

12. The control valve of claim 9 wherein said spool valve member is provided with four spools fixed thereon at set intervals.

13. The control valve of claim 12 including a flow chamber defined between each adjacent pair of said spools.

14. The control valve of claim 9 wherein said water filter is a replaceable carbon media cartridge filter.

15. The control valve of claim 9 including a seventh port defined through said housing in fluid flow communication with a household appliance.

16. The control valve of claim 15 including a seventh channel defined through said housing which provides fluid flow communication between said seventh port and said sixth channel.

17. The control valve of claim 9 including a pair of mounting brackets formed with and extending outwardly from said valve housing.

* * * * *